Figure 1:
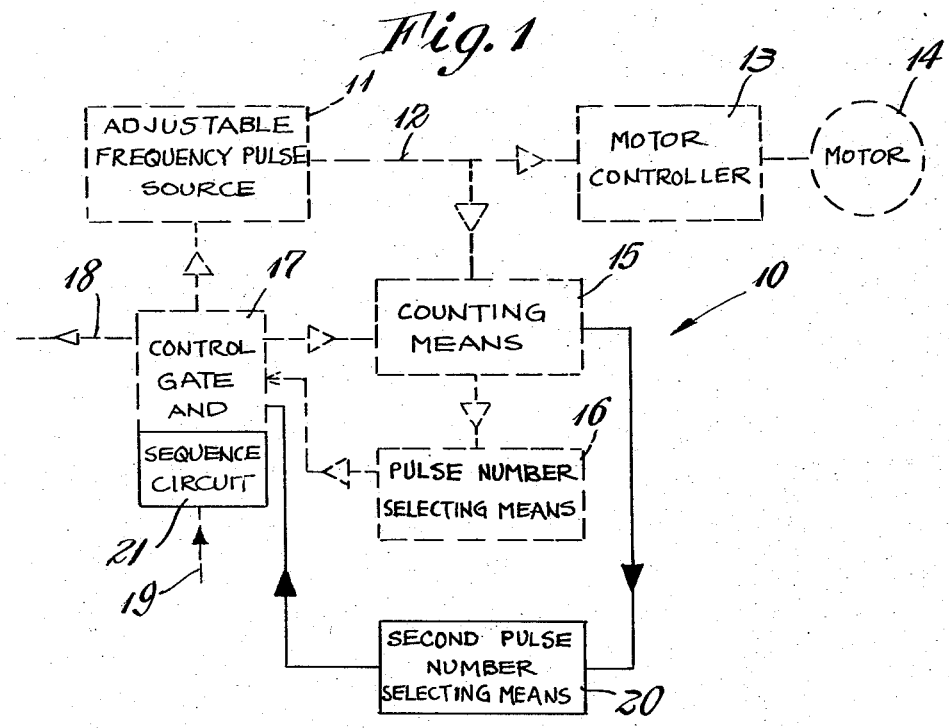

Nov. 28, 1967  A. C. LEENHOUTS  3,355,642
PLURAL CHANNEL ELECTRIC PULSE SUPPLYING DEVICE
Filed June 26, 1964  3 Sheets-Sheet 1

INVENTOR.
Albert C. Leenhouts
BY
ATTORNEYS

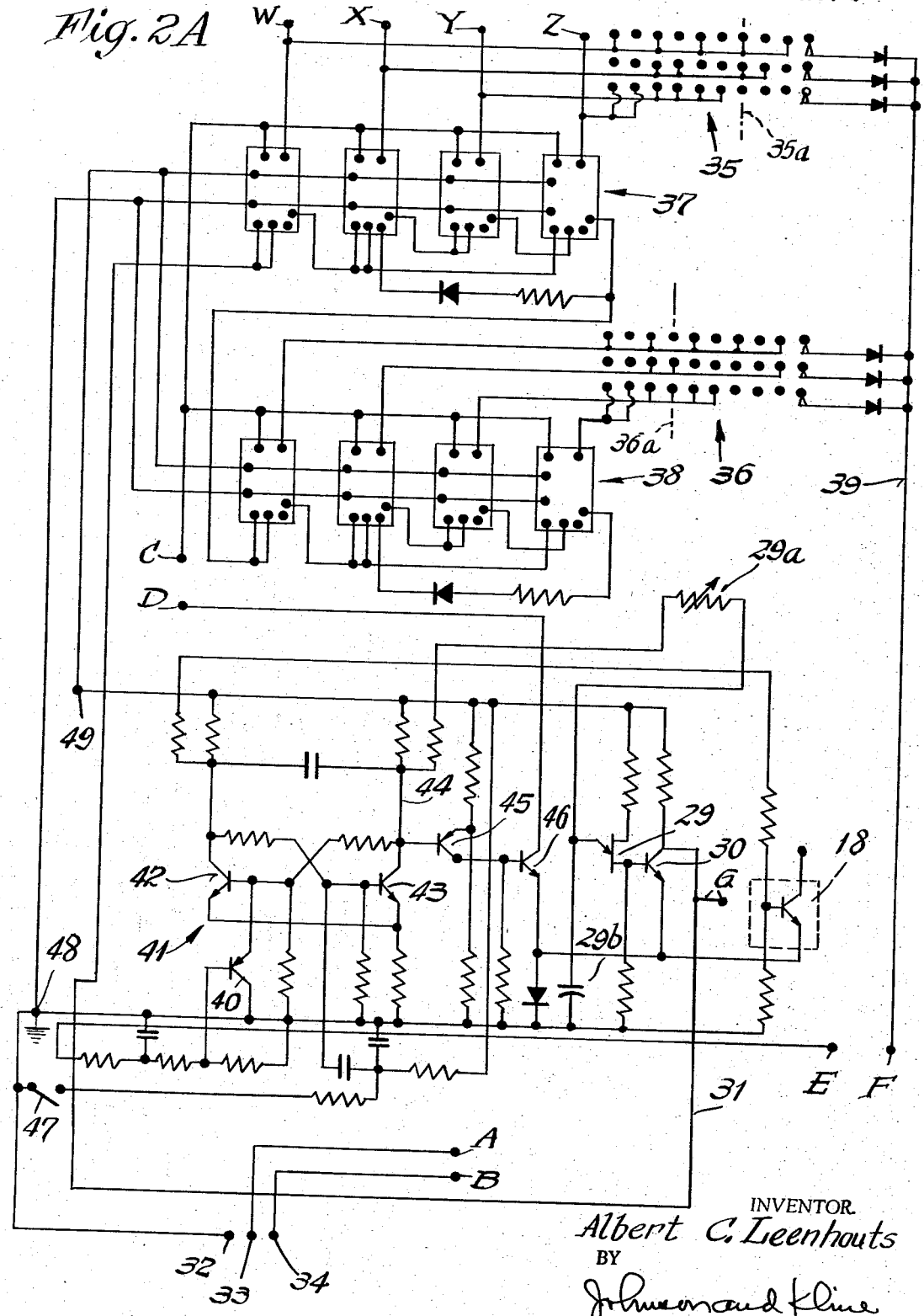

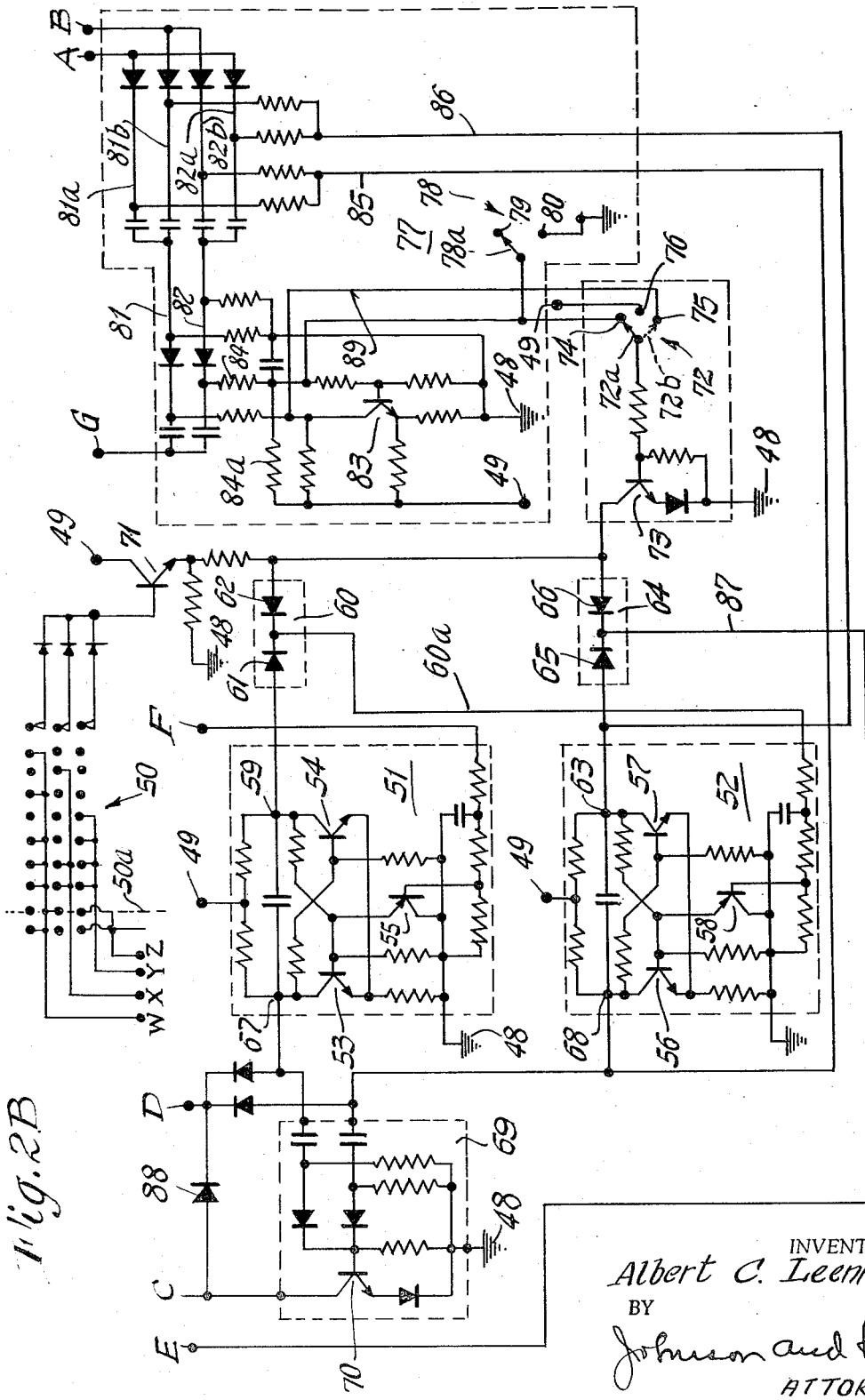

United States Patent Office 3,355,642
Patented Nov. 28, 1967

3,355,642
PLURAL CHANNEL ELECTRIC PULSE
SUPPLYING DEVICE
Albert C. Leenhouts, Granby, Conn., assignor to The
Superior Electric Company, Hartford, Conn., a corporation of Connecticut
Filed June 26, 1964, Ser. No. 378,109
12 Claims. (Cl. 318—28)

The present invention relates to a device for supplying a preselected number of electrical pulses and more particularly to such a device in which the preselected number of pulses in some instances is effectively the summation of an initial number of pulses plus other electrical pulses that are additive and subtractive with respect to the initial number of pulses.

In United States patent application, Ser. No. 291,074, filed June 27, 1963 by Elmer W. Madsen and Albert C. Leenhouts, entitled, Electric Pulse Supplying Device, and assigned to the assignee of the present invention, there is disclosed an adjustable number pulse supplying device that through a motor controller functions to direct the output movement of an electric motor. Specifically the motor is of the "stepping" type so that each pulse produces a definite incremental step or movement of the motor. For a desired total movement of the motor the number of incremental steps is determined, the pulse supplying device is set to this number of steps and upon being actuated produces this number of pulses to thereby achieve the required movement of the motor. In addition to controlling the amount of movement, the direction of movement may also be controlled as the motor is of the reversible type. However, irrespective of the direction, the motor always has heretofore moved just the extent determined by each set number of pulses.

While such a system has been found extremely satisfactory, difficulties have been encountered when the motor is utilized to control the movement of a part of a machine tool, such as the work holding carriage. Though the movement of the motor is precisely controlled, this definiteness of movement of the motor has heretofore not been capable of being easily and economically translated into the same precise movement of the part. Such loss of definiteness has been found to be generally traceable to the existence of play or looseness between the part and its operating member, the latter being driven by the motor, with the play or mechanical looseness being required to obviate binding between the part and member. Thus even though the total movement of the motor is accurately controlled to provide a definite movement, such as distance of the machine tool part, the latter because of the play between it and its operating member may not cause it to move exactly this precise length.

It is accordingly an object of the present invention to provide an electric pulse supplying device that produces signals which are capable of effecting movement of a motor in either direction but irrespective of the direction of movement, the final movement of the motor and the part driven thereby to a desired position is always achieved in the same direction.

Another object of the present invention is to provide such a device usable in a control system including a motor connected to drive an operating part of a machine tool member having play between the part and member in which the motor is caused to move in such a manner that it compensates for play between the member and the part and thus precisely moves the operating part a determined distance.

A further object of the present invention is to provide a control device that achieves the above-noted objects and yet consists of relatively few parts which may be easily incorporated into presently existing motor control systems.

In carrying out the present invention, the device is preferably utilized in a system that includes a stepping motor such as disclosed in United States Patent No. 2,982,872 entitled, Electric Motor, and a motor controller such as disclosed in United States Patent No. 3,117,268 entitled, Electric Motor Control Circuit, both assigned to the assignee of the present invention. The motor controller is interconnected with the motor and has two channels, one of which upon receipt of an electrical pulse directs the motor to take one incremental step in one direction while an electrical pulse on the other channel causes the motor to move an incremental step in the reverse direction. However, each pulse irrespective of the channel causes the motor to have the same precise movement. In the heretofore mentioned pending application Ser. No. 291,074 there is disclosed a device for supplying a preselectable number of pulses and for enabling the selection of the channel of the motor controller on which the pulses are made to appear. Thus both the direction and extent of movement of the motor may accordingly be selected.

In the above system, the motor is caused to be moved in its predetermined direction until the extent of the desired movement has been accomplished by the ceasing of the supplying of pulses by the electric pulse supplying device. The present invention is also usable in this system and may supply a settable number of pulses. However, in addition to supplying the set number of pulses the hereinafter disclosed device also supplies further pulses that are added to the initially preselected number so that the extent of movement of the motor in the desired direction is the sum of these two sets of pulses. The motor is thus directed to move a greater distance than desired. However, after completion of movement in the desired direction, pulses are supplied to the motor to cause it to move in the reverse direction to its final desired position. While it is possible to have this additive and subtractive movement occur in both directions of desired movement of the motor, preferably the device is only effective when the desired movement is in one direction. Thus the motor is always moved to its final desired position in the same direction irrespective of which direction was selected for the predetermined movement. By so directing the motor to move, the operating part driven by the motor is similarly always moved in the same direction to its final position irrespective of which direction it is required to move. By having such movement occur and by making the number of additive and subtractive pulses produce a movement of the motor and of the operating member that is greater than the play existing between it and the machine tool part, the play therebetween is accordingly compensated for and the part moves precisely the extent dictated by the initially set number of pulses.

Other features and advantages will hereinafter appear.

In the drawing:

FIGURE 1 is a block diagram of the electric pulse supplying device of the present invention.

FIGS. 2A and 2B constitute the electrical schematic diagram thereof.

Figure 3:
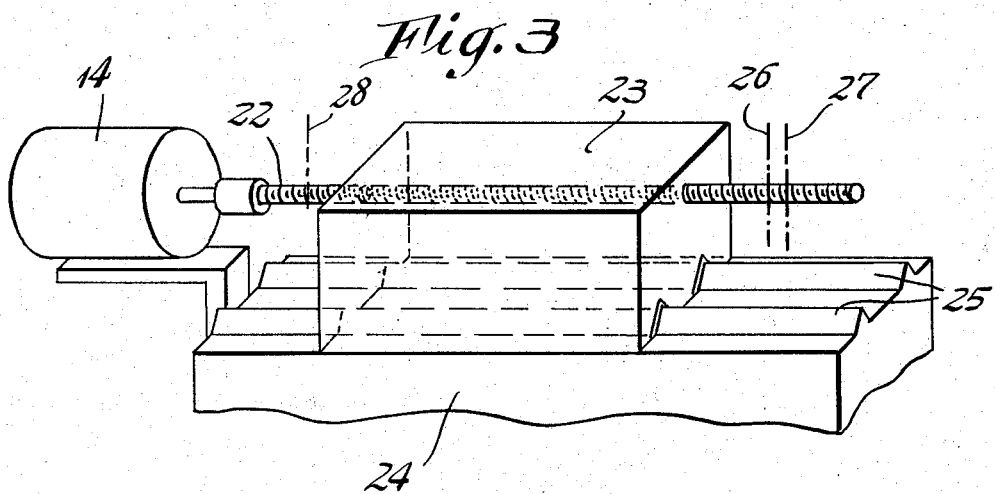

FIG. 3 is a diagrammatic representation of the use of a system in which the present invention is incorporated to control the movement of a machine tool part.

Referring to the drawing, FIGURE 1, the electric pulse supplying device of the present invention is generally indicated by the reference numeral 10 and as shown is included in a system that has an adjustable frequency pulse source 11 that produces electrical pulses on an output line 12 to a motor controller indicated in the dotted block 13 which in turn controls a motor 14. The motor controller is of the type shown in above-mentioned United States Patent No. 3,117,268 while the motor is of the type shown in United States Patent No. 2,982,872, also above mentioned. Thus for each pulse received by the motor controller from the line 12, the motor 14 is caused to move one increment, and as will be more fully after appreciated, the motor controller 13 may control the direction of rotation of the motor 14 by receiving pulses on one channel for clockwise rotation and the opposite channel for counterclockwise rotation. Moreover, the speed of movement of the motor may be adjusted, within the limits of the motor, by altering the frequency at which the pulses are supplied by the source 11.

In addition to producing pulses in the line 12, the pulse source also directs each pulse to a counting means 15 which, as will hereinafter be explained, constitutes at least one decade of binary counters. The counting means 15 has a plurality of conditions with each condition being indicative of the number of pulses that has appeared in the output line 12 and hence with each pulse the condition of the counting means 15 changes. Connected to the counting means is a pulse number selecting means 16 which has a plurality of positions, there being as many positions as there are conditions of the counting means. With only one position of the pulse number selecting means capable of being set, when this set position corresponds to the one condition of the counting means then there is a signal passed from the selecting means 16 to a control gate 17.

The control gate 17 has two states one of which permits output pulses to appear at the output line 12 and the other prevents the appearance of pulses at the output line 12 by ceasing operation of the pulse source 11 with the pulse number selecting means determining its state. It is connected to the pulse source 11 and the selecting means 16 and in addition performs a function in the other state of resetting the counting means 15 to in effect zero, as by the connection thereto. Moreover, in the other state of the control gate, it supplies a completion signal through a line indicated by the reference numeral 18 which may be employed for initiating operation of external apparatus, such as a machine tool after the completion of a cycle. Each cycle of a predetermined number of pulses is initiated by a start signal appearing in a line 19 that causes the control gate to be shifted to its first state at which it remains until actuated to its other state by the passage of a signal from the pulse number selecting means 16.

The adjustable frequency pulse source 11, counting means 15, pulse number selecting means 16, control gate 17, completion signal line 18 and start signal line 19 are shown in dotted lines in the block diagram of FIG. 1 because they comprise the subject matter of the copending application Ser. No. 291,074 above mentioned. The present invention, while also having these components, further incorporates additional components that in some instances automatically prevent the completion of the cycle after just the number of pulses selected by the selecting means 16 has been supplied to the motor control. In these instances, additional pulses are supplied with the number of the additional pulses being selected by a second pulse number selecting means 20 that is connected to be used in conjunction with the counting means 15. Initially the second selected number of pulses is added to the number of pulses selected by the selecting means 16 and the total number of pulses is supplied in the same channel as the selecting means pulses to cause an extent of movement of the motor in the selected direction that is greater than desired by the movement produced by the number of additional pulses. Upon completion of the additive movement pulses to the motor, the device 10 produces pulses on the other channel to the motor control circuit which effects a predetermined movement of the motor in a direction opposite or reverse to that direction selected by the selecting means 16. Upon completion of the pulses determining the extent of subtractive movement of the motor, the desired cycle of movement of the motor is completed and the control gate causes the pulse source 11 to cease supplying pulses and causes the supplying of a completion signal in the line 18. For repeating the same or a different cycle of movement a start signal must be supplied on the start line 19.

A sequence circuit 21 is interconnected with the control gate 17 and second pulse number selecting means 20 to decide if the additive and subtractive movement pulses are to appear and to prevent the control gate from ceasing the appearance of pulses until, if so decided, they have appeared.

While the present invention contemplates the additive movement pulses and the subtractive movement pulses to be different in number if so desired, according to the hereinafter disclosed embodiment of the invention, they are equal in number. Moreover, as will be hereinafter more fully appreciated, the sequence circuit also enables the additive and subtractive movement pulses to be added to the pulses supplied by the selecting means 16 only the movement of the motor is in the one selected direction. Thus for movement in this one direction, the completing movement of the motor is in the reverse direction while if the selecting means determines movement of the motor in the direction then the additive and subtractive movement pulses are not supplied.

The present invention and the above-described system have found particular utility when the motor 14 (referring to FIG. 3) is utilized to drive an operating member 22 of a machine tool part 23, the machine tool being generally indicated by the reference numeral 24. Generally, rotary movement of the member 22 is not translated precisely into linear movement of the part 23 by reason of there being play between the two pieces. In the specific embodiment shown, the member 22 constitutes a lead screw while the part 23 may be a work supporting carriage riding on ways 25. The play exists to prevent binding to the lead screw and carriage and enables the lead screw to be rotated a small angle before the carriage will move.

The play between the member 22 and part 23 is compensated for and thus enables the movement of the member to be precisely translated into movement of the part by always having the part or carriage move to its final desired position in the same direction. For example, with the starting position of the part 23 shown in solid lines after a previous movement in the said same direction, it being desired to move the part to the position indicated by the dotted line 26, the number of pulses required is set on the selecting means 16 to effect the necessary rotation of the member 22. Further the second pulse number selecting means 20 is set to provide a movement of the motor which is greater than the play existing between the member 22 and part 23. Thus the part 23 initially moves to the line 26, then moves beyond to the line 27 and then reverses movement to the line 26 thus completing its final movement in a leftward direction. The above sequence of movement compensates for the existing play and hence enables moving the part precisely the amount determined by the selecting means 16. If it is desired to move the part to the position indicated by the dotted line 28, the present invention provides for simply setting the selecting means 16 for the required number of pulses and upon completion of the number of pulses the motor stops at the line 28 there being no reason for additive or subtractive movements to overcome play as decided by the sequence circuit 21.

Referring specifically to FIGS. 2A and 2B, which together constitute an electrical schematic diagram of the electric pulse supplying device of the present invention, the circuit shown in FIG. 2A is substantially identical with the circuit disclosed in above-mentioned U.S. application Ser. No. 291,074 while the circuit in FIG. 2B constitutes the components 20 and 21 discussed in connection with the block diagram (FIG. 1). The pulse source 11 consists of an oscillating circuit that includes a unijunction transistor 29 connected to control conduction of a transistor 30 that supplies electrical pulses in a lead 31 by alternating between conduction and nonconduction at a frequency determined by an adjustable resistor 29a and condenser 29b in the emitter circuit of the unijunction transistor 29. The pulses appear between a common output terminal 32 and other terminals 33 or 34 with terminals 32 and 34 comprising a first output channel while 32 and 33 comprise a second output channel.

Pulses appearing between the terminals 32 and 33 cause clockwise rotation of the motor while pulses appearing at the terminals 32 and 34 effect counterclockwise movement of the motor, it being understood that merely reversing these leads to the motor controller 13 results in a switching of the movement of the motor.

For selecting the number of pulses which are supplied to the output terminals, there is a units decade selecting switch 35 and a tens decade selecting switch 36 with the switch 35 being connected to a units condition binary counter 37 while the switch 36 is connected to a tens condition binary counter 38. The switches 35 and 36 are connected in parallel to a lead 39 and in the operation of the device, pulses are supplied until the voltage in the lead 39 changes from being substantially positive to about zero voltage. This occurs when the condition of the binary counter corresponds to the set selection of the selecting switches, it being appreciated that each binary counter has a condition for each digit and thus the counter 37 changes its condition with each pulse while the counter 38 changes its condition with each ten pulses.

As set forth in the above-mentioned application, the voltage in the lead 39 is applied to the base of a transistor 40 and when it decreases to substantially zero it causes conduction of the transistor 40 with a subsequent change in state of a bistable flip-flop control circuit, generally indicated by the reference numeral 41 to effect nonconduction of a transistor 42 and conduction of a transistor 43 in the flip-flop circuit 41. This change in state causes the voltage at a collector point 44 to decrease in positive potential to a value which is insufficient to provide the necessary voltage to achieve conduction of the unijunction transistor 29 and hence ceases operation of the pulse circuit 11 and the appearance of pulses at the output terminals. In addition, the point 44 is connected to control conduction through a transistor 45 which in turn effects conduction through a reset transistor 46. The transistor 46 is interconnected to the binary counters and upon its conduction it causes each of the binary counters to assume a condition of zero to reset them for the next cycle. Until a start signal appears on the line 19 the supplying device remains with the transistor 43 conducting, no pulses appearing at the output terminals, and the binary counters being maintained at the zero condition.

The cycle for supplying a selected number of pulses has thus been completed and the device 10 requires actuation for another cycle, which may be either for a different number or the same number of pulses in the cycle. The actuation is achieved by rendering the transistor 43 nonconducting and the transistor 42 conducting by the closure of a normally open start switch 47 that supplies a negative pulse voltage from a negative power input 48 to the base of the transistor 43 to cease its conduction. As the transistors 42 and 43 are interconnected to be a base triggered bistable flip-flop circuit 41 this change causes a change in state of the circuit 41. Accordingly, the voltage point 44 becomes higher in potential by reason of its being connected to a positive power input 49, the transistor 43 ceasing conduction which stops conduction of the reset transistor 46 and supplies sufficient potential to the unijunction transistor 29 circuit to initiate conductive oscillation of the transistor 30 to again supply pulses to the output terminals. The above recited structure is more adequately disclosed in the above-mentioned copending application. The circuit elements shown in FIG. 2A are interconnected with those shown in FIG. 2B by having common points A, B, C, D, E, F, G, W, X, Y and Z. In addition the connection to the positive power input terminal in both figures is indicated by reference numeral 49 while connections to the negative power terminal are indicated by a ground symbol 48.

Referring to FIG. 2B, there is shown a second pulse number selecting switch 50 similar in construction to the selecting switches 35 and 36. The switch 50 is used in conjunction with the unit decade counter 37 by reason of the connection between points W, X, Y and Z. While only the unit decade counter and one selecting switch have been shown thus causing the additive and subtractive pulses not to exceed nine in number, with both the additive and subtractive pulses being the same in number, it is contemplated that additional decade counters and switches could be employed if desired to increase the number of additive or subtractive pulses. In addition if desired separate selecting switches may be employed for additive and for subtractive movement pulses to render a different number of pulses for each movement.

There is provided a first base triggered, bistable flip-flop circuit 51 and another base triggered, bistable flip-flop circuit 52. The circuit 51 includes transistors 53 and 54 together with triggering transistor 55 while the other circuit 52 includes transistors 56 and 57 with triggering transistor 58. A collector output voltage point 59 of circuit 51 is connected to a gate 60 composed of oppositely facing diodes 61 and 62. Similarly the circuit 52 has a collector output voltage point 63 connected to a gate 64 also having oppositely facing diodes 65 and 66. The other collector output voltage point 67 of the circuit 51 and similar point 68 of circuit 52 are connected to a reset circuit 69.

The reset circuit includes a transistor 70 which is normally nonconducting but is rendered momentarily conductive by a spike of positive voltage appearing from either of the points 67 and 68 applied to the base thereof. The voltage spike required to cause conduction of the transistor 70 only occurs when either of these output points 67 and 68 is changing from a low to a high positive potential.

The lead 39 is connected to points F and to the base of transistor 55 to control the conduction thereof and hence enable changing the state of the circuit 51. The switch 50 is connected to the base of a transistor 71 to control conduction through its collector-emitter to the gate 60 and the gate 64. Additional elements are a three-position switch 72 connected to the base of a transistor 73, the latter having its emitter-collector connected in series with the emitter-collector of transistor 71. The section switch 72 enables selection of the direction of movement in which the additive and subtractive movement pulses will occur and also enables the operator to prevent the appearance of the additive and subtractive pulses in either direction and thus cause the electric pulse supplying device of the present invention to operate in the same manner as the device disclosed in U.S. application Ser. No. 291,074. Specifically, engagement of switch arm 72a with a contact 74 causes additive and subtractive movement pulses to occur in a counterclockwise movement of the motor while engagement with a contact 75 causes said pulses to appear for clockwise movement and engagement with a contact 76 functions to prevent any appearance of additive and subtractive movement pulses. For determining the direction of movement of the motor by selection of the channel on which the pulses selected by the selecting switches 35 and 36 appear, there is provided a selecting circuit 77 that includes a two-position switch 78 having a swtich arm 78a and contacts 79 and 80. Engagement of the switch arm 78a with the contact 79 causes clockwise movement of the motor while engagement of the arm 78a with contact 80 causes counterclockwise movement for the pulses selected by the switches 35 and 36.

The selecting circuit 77 receives negative pulses from the transistor 30 through the point G to a first path indicated by the reference numeral 81 and a second path indicated by the reference numeral 82. For controlling which path 81 or 82 is permitted to pass the pulses, there is provided a transistor 83, which is conducting when the switch arm 78a is in engagement with the contact 79. In this position, pulses are permitted to pass on the path 81, the pulses being a pulse from a high positive potential to a low positive potential and hence a negative pulse but the path 82 by having resistors 84 and 84a connected to the positive input 49 has a positive potential therein which prevents the passage of pulses therethrough. However, when the switch arm 78a is in engagement with the contact 80, the latter being connected to the negative input 48, the transistor 83 is rendered nonconducting, causing a positive potential on the path 81 by the collector thereof having an increased positive potential. Also a short circuit path for the resistor 84 through contact 80 to the negative input 48 is effected, thereby eliminating the positive potential in the path 82 and permitting pulses to pass therethrough.

The path 81 divides into paths 81a and 81b while the path 82 also divides into paths 82a and 82b. The paths 81a and 82a are connected to the point A and hence to the output terminal 34. In addition, the paths 81b and 82b are connected to the point B and hence to the output terminal 33, the paths thus providing two output channel means for the pulses. The paths 81a and 82b are connected to a lead 85 while the paths 81b and 82a are connected to a lead 86. It will be appreciated that with a positive potential on the lead 85, pulses are prevented from passing through the paths 81a and 82b while with a positive potential on the lead 86 paths 81b and 82a are prevented from passing pulses. Thus pulses from the point G may traverse either the path 81 or the path 82 and if the former, then path 81a or 81b to points A and B respectively; if through the path 82, then through either the path 82a or 82b to the points A and B respectively. In either condition, the present invention provides for the pulses appearing only at the point A or the point B and hence the output terminals 33 and 34 respectively.

In the operation of the above-described device, the circuit is initially energized by connection of the positive input and negative input terminals 49 and 48 respectively to a proper source of unidirectional current. The number of pulses desired to be transmitted to the motor 14 through the motor control 13 is initially set by the position of the selecting switches 35 and 36. If the number of pulses initially desired is 63, the position of the switches will be indicated by dotted lines 35a and 36a. The starting switch 47 is closed causing a negative pulse to appear at the base of transistor 43 which changes the state of the circuit 41, with transistors 42 and 43 being rendered conducting and nonconducting respectively. In this state, the high positive potential at the point 44 prevents conduction of the reset transistor 46 thereby enabling the binary counters 37 and 38 to change their condition with each pulse. Additionally, conduction of the unijunction transistor 29 begins causing alternating conduction of the transistor 30 to produce pulses at a rate controlled by the resistor 29a. The pulses appear at the point G and as it is desired to have the motor step 63 steps in a clockwise direction, the switch arm 78a is in engagement with contact 79 to thus enable pulses to traverse the path 81 by reason of the conduction of the transistor 83 and be prevented from traversing the path 82 by the positive potential at the resistor 84. In addition, the circuit 52 is in a state where transistor 56 is conducting while the transistor 57 is nonconducting and hence the lead 86 connected to the collector output point 63 of the transistor 57 has a high positive potential, preventing passage of the negative pulses through the path 81b. Thus the pulses pass through the paths 81 and 81a to the point A and hence to the clockwise output 33.

As it is desired to have additive and subtractive movement pulses appear only when the motor is initially set to move in the clockwise direction, switch arm 72a is in engagement with the contact 75 as indicated by the dotted line 72b thereby placing a low potential on the base of transistor 73 preventing it from conducting. In addition, the number of pulses determined by the extent of play to cause a subtractive movement greater than the play is set by the selecting switch 50 and assuming the number is 8, this switch position is indicated by the dotted line 50a. The pulses continue to appear at the clockwise terminal 33 until the determined number of pulses, 63, is reached when the condition of the binary counters 37 and 38 correspond to the position of the selecting means 35 and 36 and this changes the potential in the lead 39 from a high positive potential to a substantially zero potential. During the appearance of the determined number of pulses as set by the switches 35 and 36, the circuit 51 is in the state when transistor 53 is conducting and transistor 54 is nonconducting thereby rendering the collector output point 67 of low positive potential and the point 59 of high positive potential. The change in voltage in the lead 39 caused by a completion of the selected number of pulses is transmitted through the point F to the base of transistor 55 causing it to conduct and change the state of circuits 51 whereby transistor 53 becomes nonconducting and transistor 54 conducting. This causes the point 67 to change from a low to a high potential while the point 59 changes from a high to a low potential. Upon this occurring, the point 67 produces a positive voltage spike which is transmitted to the base of transistor 70 and momentarily causes conduction thereof. During this moment of conduction, the binary counters 37 and 38 are in effect connected to the negative input 48 through the point C and thus the counters are reset to a zero condition. Moreover, the gate 60 becomes conductive, to a lead 60a, by reason of the potential at the collector output point 59 changing from high to low positive potential thereby permitting a positive potential from the transistor 71 to pass through the diode 62 and lead 60a to the transistor 58 of the circuit 52.

It will be appreciated that the base of transistor 71 is positive for the same reason that the lead 39 is positive during the transmission of pulses until the desired number is reached wherein it changes from high potential to substantially zero and hence would cease conduction of transistor 71. Moreover, as both the flip-flops 51 and 52 are bistable, they retain the state to which they are shifted until shifted again by, for example in the circuit 51, a low positive or negative voltage being applied to the transistor 55 or the collector output point 67.

As the circuit 52 has not changed state upon the completion of the desired number of pulses, there is no change in the selecting circuit 77 and pulses will continue to pass along the paths 81 and 81a to the terminal 33 to provide the additonal pulses for movement of the motor in the desired or clockwise direction. The frequency of the pulses is quite low, i.e., may be on the order of 300 per second while the conduction time of the transistor 70 is quite short thereby preventing any loss in the count of pulses as the binary counters are reset to zero. Also, as there has been no change in state in the control circuit 41, the transistor 30 will continue to supply pulses.

Accordingly, after eight pulses have appeared at the output terminal 33, the transistor 71 ceases conduction by the potential at its base decreasing to substantially zero as the condition of the unit decade counter corresponds to the position of the selecting swtich 50. This decreases the positive potential in the lead 60a effecting conduction of the transistor 58 and a change in state of the circuit 52 so that transistor 56 now becomes nonconducting and transistor 57 conducting. A positive voltage spike appears at the output point 68 as its potential is raised which through its connection to the transistor 70 causes immediate resetting of the binary counters 37 and 38 to zero. In addition, the collector output point 68 now places its high positive potential on the lead 85 preventing passage of pulses in the path 81a while the collector output point 63, by having its potential changed from a high to a low potential, reduces the potential in the lead 86 enabling pulses to pass through the paths 81 and 81b to the output terminal 34 through the point B. Moreover, when the binary counters are reset, the potential at the base of transistor 71 is again caused to become high by reason of the failure of the position selected by the switch 50 and the condition of the binary counters to correspond. The above occurs within the time between consecutive pulses and as there has been no change in the condition of the transistors 42 and 43, the transistor 30 continues to supply pulses without any interruption thereof.

With the transistor 71 conducting, pulses continue to appear at the point B until eight pulses have appeared at which time the transistor 71 is again rendered nonconducting which decreases the potential to the diode 66 and as the anode of the diode 65 is at a low potential, the change in potential passes through the gate 64 into a lead 87 which passes through the point E to the base of transistor 40. The low potential at the base enables conduction through the collector-emitter of transistor 40 which changes the state of circuit 41 to have transistor 42 nonconducting and transistor 43 conducting. The collector output point 44 decreases in potential rendering the transistors 45 and 46 conducting and ceasing the ability of unijunction transistor 29 to cause conduction of the transistor 30 thus preventing further pulses from occurring.

The conduction of the transistor 46 through the point D places a low potential on the collector output points 67 and 68 of circuits 51 and 52 respectively thereby resetting them to their initial condition where these points are both low and transistors 53 and 56 conducting. In addition through a diode 88, connected between the points C and B, the binary counters will also be reset through the transistor 46. At this time, the potential in the leads 85 and 86 is changed to their former condition, becoming high and low respectively so that the next cycle of pulses would move the motor in the forward direction.

If it is desired to again repeat the above cycle of 63 desired pulses, 8 additive movement pulses and 8 subtractive movement pulses, switch 47 is closed, changing the state of the transistors 42 and 43 by a negative pulse appearing on the base of transistor 43 of sufficient duration and amplitude to change its conduction. If however the next cycle were to cause movement in the reverse direction by the appearance of pulses at the terminal 34, then operation of the switch arm 78 into engagement with the contact 80 is required. In this position, the negative input 48 is connected through the contact 80, switch arm 78a to the base of transistor 83 preventing it from conducting and thereby placing a high potential in the path 81 while the resistor 84 is connected to the negative input which eliminates the positive potential in the path 82 enabling pulses to pass therethrough to the paths 82a and 82b. However, as the lead 86 is high in potential, pulses are prevented from passing on path 82a and hence pass on path 82b to the point B and terminal 34. Also, as it is desired, according to the present invention, to move the motor to its desired position always in one direction, then additive and subtractive movement pulses will be prevented from appearing. This is achieved by the switch arm 72 remaining in the dotted line position 72a to connect the base of transistor 73 to the lead 89 causing a high potential to appear at its rendering transistor 73 conducting.

Upon the completion of the determined number of pulses as set by switches 35 and 36, the change in potential in lead 39 through the point F causes a change in the state of the circuit 51 resetting the binary counters and enabling a low potential to pass through the gate 60 to the circuit 52. The conduction of transistor 73 provides in effect a short circuited path for current through the emitter-collector of transistor 71 and hence a low potential at the diodes 62 and 66. Accordingly, low potential at the point F causes a change of state in the circuit 51 which permits the low potential at the diode 62 to pass through the lead 60a to the transistor 58 and effect a change of state in the circuit 52. This latter shifts the output collector point 63 from a high to a low potential enabling the low voltage at the diode 66 to pass to the lead 87 and to render transistor 40 conducting. Again, on conduction of transistor 40 the transistors 42 and 43 change their state, causing the transistor 46 to become conductive to reset the circuits 51 and 52 together with resetting the counters and maintaining them in their zero condition and stopping oscillation of the unijunction transistor 29. It will be understood however that in the just described cycle if additive and subtractive pulses were desired, then a shifting of the switch arm 72a to engage contact 74 would be the only operation required.

If it is desired to provide the additive and subtractive movement pulses when the motor is moving in the desired counterclockwise direction by the selected number of pulses appearing at the terminal 34, the switch arm 78a is shifted into engagement with the contact 80 and the switch arm 72a is shifted into engagement with the contact 74. Thus the pulses that appear, as determined by the switches 35 and 36, will pass through the path 82 into the paths 82a and 82b and as the path 82a is a high potential by reason of the high potential in lead 86, the pulses pass through the path 82b to the terminal 34. The additional pulses also will pass through the paths 82 and 82b while with a reversing of the potential in leads 85 and 86 when the circuit 52 changes its state the subtractive movement pulses will traverse the paths 82 and 82a to the forward terminal 33.

It will be appreciated that additive and subtractive movements may be eliminated by engagement of the switch arm 72 with the contact 76 thereby causing continuous conduction of the transistor 73.

The specific construction of the circuits 51 and 52 are similar to the control circuit 41, the latter being fully described in the above-mentioned copending application where the components of the device 10, shown in FIG. 2A, are also disclosed. The transistors 70, 73 and 83 are all type 2N1302 and the resistors associated therewith are employed to maintain the proper bias voltage and value of current flow as is well known in the art.

It will accordingly be appreciated that there has been disclosed an electric pulse supplying device in which the number of pulses supplied may be selected and after the appearance of such a number the appearance of pulses ceases. Such a device has particular utility when utilized as the control unit that determines the direction and extent of movement of a reversible stepping motor with the motor moving an operating member of a machine tool. Though mechanical backlash would prevent translation of precise movement of the motor into movement of the operating member, the present invention provides for always moving the motor and hence the operating member to its final desired position in the same direction. Thus, if the carriage is desired to move a distance corresponding to a selected number of pulses, the selected number is then supplied and also supplied is a predetermined number of additional movement pulses and subsequently a predetermined number of subtractive movement pulses which cause the operating member to move in the reverse direction than that initially selected to its final position. When the operating member is required to move in the reverse direction for the selected number of pulses, then additive and subtractive movement pulses are not supplied.

I claim:

1. An electric pulse supplying device having two independent output channels on which electrical pulses may appear comprising a first output channel means, a second output channel means, oscillating means for producing electrical pulses, means interconnecting the oscillating means with said output channel means, settable means for selecting a desired number of pulses to be produced on one channel means and producing a signal indicative of the completion of production of the desired number of pulses, second means connected to receive the signal and operative to produce a determined number of pulses on the other channel means, said second means producing a second signal indicative of the completion of production of the determined number of pulses and third means receiving said second signal and operative to prevent further pulses from appearing on either channel means.

2. An electric pulse supplying device having two independent output channels on which electrical pulses may appear comprising a first output channel means, a second output channel means, oscillating means for producing electrical pulses, means interconnecting the oscillating means with said output channels and including selecting means for selecting the first or the second channel means on which the pulses are to appear, settable means for selecting a desired number of pulses to be produced on the one selected channel means and producing a signal indicative of the completion of production of the desired number of pulses, second means connected to receive the signal and operative to produce a determined number of pulses on the other channel means, said second means producing a second signal indicative of the completion of production of the determined number of pulses and third means receiving said second signal and operative to prevent further pulses from appearing on either channel means, said second means being operative to produce pulses on the other channel means only when the selecting means selects the one channel means on which the desired number of pulses are to appear.

3. An electric pulse supplying device having two independent output channels on which electrical pulses may appear comprising a first output channel means, a second output channel means, oscillating means for producing electrical pulses, means interconnecting the oscillating means with said output channel means and including selecting means for selecting the first or the second channel means on which the pulses are to appear, settable means for selecting a desired number of pulses to be produced on the one selected channel means and producing a signal indicative of the completion of production of the desired number of pulses, second means connected to receive the signal and operative to produce a determined number of pulses on the other channel means, said second means producing a second signal indicative of the completion of production of the determined number of pulses, third means for receiving either said first and second signals and operative to prevent further pulses from appearing on either channel means, and fourth means for preventing actuation of said second means when the selecting means selects the other channel and effecting operation of said third means by said first signal.

4. An electric pulse supplying device having two independent output channels on which electrical pulses may appear comprising a first output channel means, a second output channel means, oscillating means for producing electrical pulses, means interconnecting the oscillating means with said output channel means, a settable means for selecting a desired number of pulses to be produced on one channel means, additional means interconnected with the oscillating means and the one channel means for producing a determined number of pulses on the one channel means in addition to the selected number and producing a signal indicative of the completion of the determined number, second means connected to receive the signal and operative to produce a determined number of pulses on the other channel means and producing a second signal indicative of the completion of production of the determined number of pulses and third means receiving said second signal and operative to prevent further pulses from appearing on either channel.

5. An electric pulse supplying device having two independent output channels on which electrical pulses may appear comprising a first output channel means, a second output channel means, oscillating means for producing electrical pulses and including selecting means for selecting the first or the second channel means on which the pulses are to appear, means interconnecting the oscillating means with said output channels, settable means for selecting a desired number of pulses to be produced on the one selected channel means and producing a first signal indicative of the completion of production of the desired number of pulses, additive means interconnected with the oscillating means and the one channel means for producing a determined number of pulses on the one channel means in addition to the selected number upon receipt of the signal from the settable means and for producing a second signal indicative of the completion of the determined number, second means connected to receive the second signal and operative to produce a second determined number of pulses on the other channel and producing a third signal indicative of the completion of production of the second determined number of pulses, third means receiving said first and third signals and operative to prevent further pulses from appearing on either channel means, and fourth means for preventing actuation of said additive and second means when the selecting means selects the other channel means for the appearance of the desired number of pulses.

6. The invention as defined in claim 5 in which the settable means includes an adjustable element for enabling one of a plurality of a number of pulses to be selected.

7. The invention as defined in claim 5 in which there is an adjustable means interconnected with the additive means and the second means for enabling one of a plurality of a number of pulses to be determined, said additive means and second means each supplying the same number of pulses determined by the adjustable means.

8. The invention as defined in claim 5 in which the settable means includes at least one decade counter having a condition that changes for each pulse and adjustable means for enabling one of a plurality of a number of pulses to be selected, and a second adjustable means interconnected with the additive and second means for enabling one of a number of pulses to be determined, said second adjustable means being interconnected with said decade counter to provide the signals therefrom upon completion of the production of the determined number of pulses and the second determined number of pulses.

9. The invention as defined in claim 5 in which the additive means includes a bistable flip-flop circuit which changes its state upon receipt of the signal from the settable means and the second means includes a bistable flip-flop circuit which changes its state upon receipt of the second signal.

10. In combination with a machine tool part mounted for reciprocating movement and an operating member operatively associated therewith with mechanical play therebetween, a reversible motor connected to said operating member, a motor control circuit connected to said motor and a source of electrical energy for energizing said motor to control the direction and extent of movement of said motor, and settable means having two channels connected to said motor controller for producing pulses on one or the other of said channels and including means for selecting the channel and the number of pulses, said channel selection controlling the direction of movement of said motor and said number of pulses controlling the extent of movement of said motor, the improvement comprising means in said settable means for setting a determined additional number of pulses supplied to said motor control circuit on the selected channel to cause an additional movement of the motor in the desired direction in addition to the movement selected by the settable means and means for setting a determined number of pulses supplied to said motor circuit on the other channel upon completion of the pulses supplied on the selected channel to cause a movement of said motor in the reverse direction.

11. In combination with a machine tool part mounted for reciprocating movement and an operating member operatively associated therewith with mechanical play therebetween, a reversible motor connected to said operating member, a motor control circuit connected to said motor and a source of electrical energy for energizing said motor to control the direction and extent of movement of said motor, and settable means having two channels connected to said motor controller for producing pulses on one or the other of said channels and including means for selecting the channel and the number of pulses, said channel selection controlling the direction of movement of said motor and said number of pulses controlling the extent of movement of said motor, the improvement comprising first means in said settable means for setting a determined additional number of pulses supplied to said motor control circuit on the selected channel to cause an additional movement of the motor in the desired direction in addition to the movement selected by the settable means, second means for setting a determined number of pulses supplied to said motor circuit on the other channel upon completion of the pulses supplied on the selected channel to cause a movement of said motor in the reverse direction and third means connected to said second means for preventing further pulses to said motor control circuit.

12. In combination with a machine tool part mounted for reciprocating movement and an operating member operatively associated therewith with mechanical play therebetween, a reversible motor connected to said operating member, a motor control circuit connected to said motor and a source of electrical energy for energizing said motor to control the direction and extent of movement of said motor, and settable means having two channels connected to said motor controller for producing pulses on one or the other of said channels and including means for selecting the channel and the number of pulses, said channel selection controlling the direction of movement of said motor and said number of pulses controlling the extent of movement of said motor, the improvement comprising first means in said settable means for setting a determined additional number of pulses supplied to said motor control circuit on the selected channel to cause an additional movement of the motor in the desired direction in addition to the movement selected by the settable means, second means for setting a determined subtractive movement of said motor in the reverse direction upon completion of the movement in the desired direction and third means for preventing the supplying of pulses to said motor control circuit when the settable means selects the other channel whereby said motor always completes its movement in one direction.

No references cited.

ORIS L. RADER, *Primary Examiner.*

G. SIMMONS, *Assistant Examiner.*